United States Patent [19]

Musselmann

[11] Patent Number: 4,708,295

[45] Date of Patent: Nov. 24, 1987

[54] SYSTEM FOR WASTE PAPER CONDITIONING

[75] Inventor: Walter Musselmann, Heidenheim, Fed. Rep. of Germany

[73] Assignee: J. M. Voith GmbH, Heidenheim, Fed. Rep. of Germany

[21] Appl. No.: 721,326

[22] Filed: Apr. 9, 1985

[30] Foreign Application Priority Data

Apr. 17, 1984 [DE] Fed. Rep. of Germany ....... 3414460
Jun. 8, 1984 [DE] Fed. Rep. of Germany ....... 3421330

[51] Int. Cl.$^4$ .......................... D21B 1/12; D21B 1/32
[52] U.S. Cl. ...................................... 241/46.17; 162/4; 162/55; 209/273; 241/80
[58] Field of Search .............................. 162/4, 55, 261; 241/46.17, 28, 24, 80; 209/17, 27 B, 211

[56] References Cited

U.S. PATENT DOCUMENTS

| 3,989,197 | 11/1976 | Neitcel | 241/46.17 |
| 4,017,033 | 4/1977 | Tra | 162/4 |
| 4,136,018 | 1/1979 | Clark | 209/273 |
| 4,231,526 | 11/1980 | Ortner et al. | 162/4 |
| 4,252,640 | 2/1981 | Musselmann | 209/273 |
| 4,397,713 | 8/1983 | Lambrecht | 162/4 |

FOREIGN PATENT DOCUMENTS 2757580 7/1978 Fed. Rep. of Germany .......... 162/4
2757581 5/1979 Fed. Rep. of Germany .......... 162/4

Primary Examiner—S. Leon Bashore
Assistant Examiner—K. M. Hastings
Attorney, Agent, or Firm—Jeffers, Hoffman & Niewyk

[57] ABSTRACT

A process and a secondary pulper used in a system for waste paper conditioning wherein the secondary pulper has a tumbling space separated from an accepted stock space by a screen. The secondary pulper includes a central drain line through which a fraction of fiber suspension enriched with light dirt is removed at one end of the secondary pulper, and a circumferential line through which a fraction of the fiber suspension enriched with heavy dirt is removed from the secondary pulper. A pulp inlet sleeve surrounds the central drain line and receives fiber suspension enriched with heavy dirt from the circumferential drain line through a conduit from the circumferential drain line to the pulp inlet sleeve so that the fiber suspension enriched with heavy dirt enters the tumbling space adjacent the entrance to the central drain line.

4 Claims, 4 Drawing Figures

SYSTEM FOR WASTE PAPER CONDITIONING

BACKGROUND OF THE INVENTION

The invention relates to a system for a waste paper conditioning, and more specifically, to a system for waste paper conditioning having a secondary pulper.

German Patent Disclosure No. 25 14 162 (U.S. Pat. No. 4,017,033) shows a system for waste paper conditioning utilizing a secondary pulper wherein this arrangement serves to pass the fraction drawn from the secondary pulper, which is enriched with heavy dirt, into a hydrocyclone. The accepted stock removed from the hydrocyclone is then returned to the primary pulper.

In another system for waste paper conditioning shown in German Patent Document No. 27 59 113, (U.S. Pat. No. 4,231,526) the fraction enriched with light dirt and the fraction with heavy dirt pass through the hydrocyclone and are discharged from the secondary pulper. These fractions are subjected to several purification stages wherein accepted stock produced in the interim is routed to an accepted stock vat, and finally, a residual portion heavily laden with dirt is routed back to the primary pulper.

As can be appreciated, it is very expensive to design a system such as that described above for performing the necessary processing steps until the accepted stock has been reasonably rid of dirt and a residual portion of fiber suspension, which is relatively heavily laden with dirt, is obtained and returned to the pulper. It was previously suggested to separate the dirt through a wash filter and pass it to a decker, but the heavy dirt was to be passed from the secondary pulper to the wash filter in a separate phase which would require a certain expense for switching and controlling the slides.

It would thus be desirable to provide an improved waste paper conditioning system which is simplified and inexpensively designed.

SUMMARY OF THE INVENTION

It is an object of the invention to provide a system for waste paper conditioning that is of a simplified design as compared to earlier systems, and consequently, is less expensive to construct.

In one form thereof, the invention is a process for waste paper conditioning using a secondary pulper having a tumbling space separated from an accepted stock space by a screen, wherein the process comprises: removing a fraction of fiber suspension enriched with light dirt through a central drain line centrally located at one end of the secondary pulper, removing a fraction of fiber suspension enriched with heavy dirt through a circumferential drain line located at the circumference of the secondary pulper, passing the fiber suspension enriched with heavy dirt through a short direct conduit from the circumferential drain line to a pulp inlet sleeve surrounding the central drain line, and returning the fiber suspension enriched with heavy dirt into the tumbling space of the secondary pulper through the pulp inlet sleeve.

In another form thereof, the invention is a secondary pulper used in a system for the conditioning of waste paper comprising a tumbling space separated from an accepted stock space by a screen. A central drain line, communicating with the tumbling space, for removal of fiber suspension enriched with light dirt is at one end of the secondary pulper, and a circumferential drain line, communicating with the tumbling space, for removal of fiber suspension enriched with heavy dirt is connected to the secondary pulper. A pulp inlet sleeve surrounds the central drain line and has one end thereof opening into the tumbling space. A conduit connects the circumferential drain line to the pulp inlet sleeve so that the fiber suspension enriched with heavy dirt is introduced by a direct path into the pulp return sleeve.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings.

DETAILED DESCRIPTION OF SPECIFIC EMBODIMENTS

Figure 2:
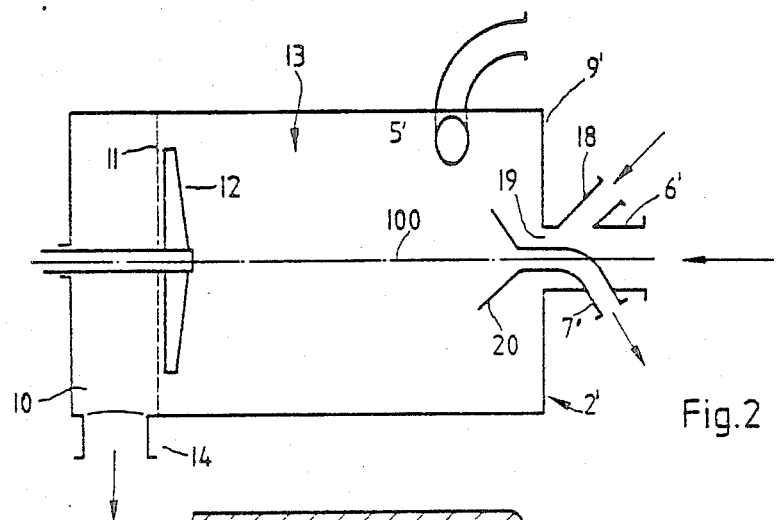
FIG. 2 is a schematic view of another specific embodiment of a secondary pulper.
Figure 1:
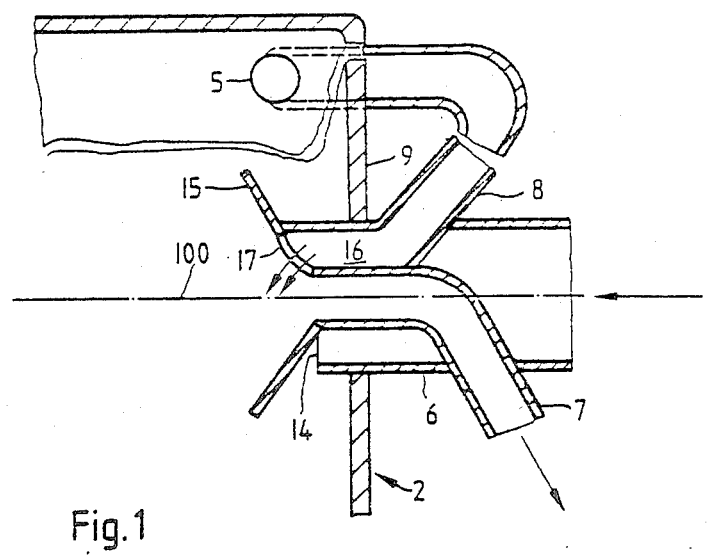
FIG. 1 is a cross sectional view of one end of one specific embodiment of a secondary pulper.

Referring to FIGS. 1 and 2, the secondary pulper is of an essentially round cylindrical shape and includes adjacent one end thereof a screen 11 which is disposed so as to be generally perpendicular to the central longitudinal axis 100. A rotor 12, consisting of essentially of a spider mounted on a shaft, is positioned adjacent screen 11. Screen 11 partitions a space, termed an accepted stock space, from which accepted stock is removed through connection 14 from the remaining space within the secondary pulper. Rotor 12 generates in the secondary pulper a vortex flow having an axis that coincides with the central longitudinal axis 100 of the secondary pulper. A heavy dirt fraction of the fiber suspension is removed along the circumferential wall of the secondary pulper through an opening to circumferential drain line 5 or 5'. Various connections are located at the end of the secondary pulper that is opposite the screen. One connection, or central pulp inlet sleeve, 6 or 6' provides for the passage of fiber suspension to the secondary pulper. Another connection or central drain line 7 or 7' provides for the removal of fiber suspension enriched with light dirt. In regard to the specific embodiment of FIG. 1, the fraction of the fiber suspension enriched with heavy dirt is recycled to the secondary pulper via circumferential drain line 5 through the pulp inlet sleeve 8 which empties first into a connection 6, but continues into a chamber 16 having a discharge opening 17 which permits the fiber suspension to empty into the area of the entrance opening of central drain line 7. Discharge opening 17 is contained in a conically shaped baffle 15 which deflects in a radially outward fashion the fiber suspension entering the secondary pulper from pulp inlet sleeve 6. This makes it possible to introduce the fiber suspension in the secondary pulper at low pressure losses without disturbing the flow conditions in the secondary pulper. More specifically, this introduction of fiber suspension through pulp inlet sleeve 6 will not interfere with the removal of contaminates of light and heavy type through drain lines 7 and 5, respectively. The unnumbered arrows indicate additionally the flow direction of the fiber suspension. The angle of inclination of the baffle 15 relative to axis 100 can be between about 30° to about 60°. The outside diameter of the baffle 15 (in FIG. 1) or baffle 20 (in FIG. 2) is about 1.2 to 2 times the inside diameter of the entrance or inlet sleeve 6. The diameters of the drain lines 5 and 7 are about 0.2 to about 0.6 times that of the pulp inlet sleeve 6. The diameter of the sleeve 6 is at a maximum 0.25 times the overall diameter of the secondary pulper.

In the specific embodiments illustrated in FIGS. 1 and 2, the pulp inlet sleeves 6 or 6' is of a generally straight design while the central drain lines 7 or 7' are of an elbow type construction; however, it should be appreciated that this arrangement may be reversed.

The specific embodiment illustrated in FIG. 1 also makes it possible, in addition to removing a fraction enriched with contaminates, to also feed the heavy dirt fraction through connection 8, with this fraction then being drawn from the secondary pulper 2 through central drain line 7 along with the fraction enriched with light dirt.

FIG. 2 illustrates a specific embodiment wherein the fraction laden with heavy dirt and removed through circumferential drain line 5' is recycled into the inlet sleeve 6' via connection 18 after an interim cleaning, for example, by means of a hydrocyclone, whereafter the fiber suspension proceeds through the mouth 19 of connection 6', along with the newly fed fiber suspension into the secondary pulper 2'. The recirculation of the interim-cleaned fraction generally enables a good removal of heavy dirt shares from the process.

The specific embodiment according to FIG. 1 requires an aftercleaning with regard to the heavy contaminates in a separate device following the secondary pulper. In this respect, however, reference is made to the following wherein a simple solution to the problem is being taught. The solution provided by the invention nets a considerable increase of the entire throughput of the secondary pulper wherein it may amount to a 40 percent improvement.

Figure 3:
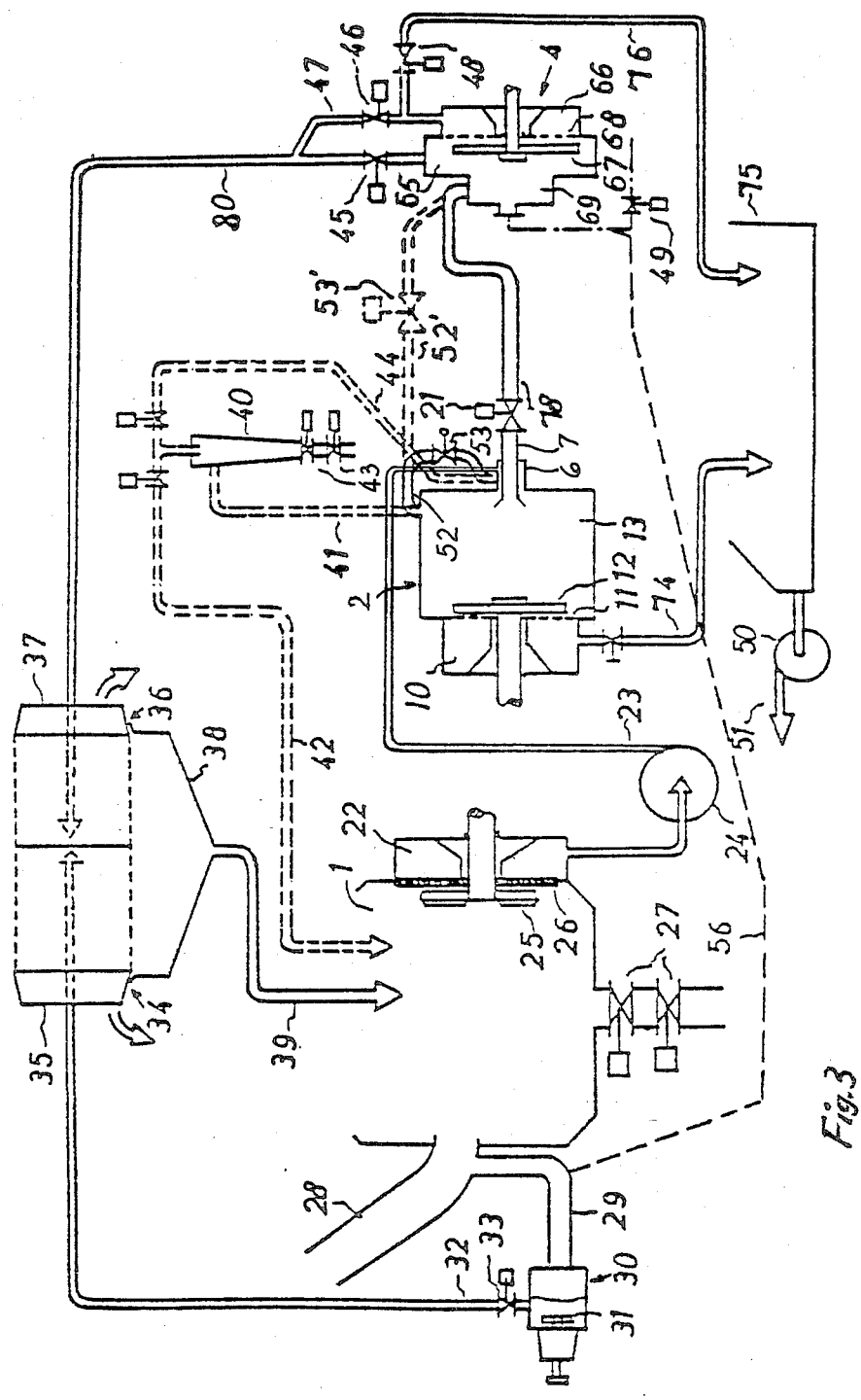
FIG. 3 is a diagrammatic view of a specific embodiment of a waste paper conditioning system.

Referring to FIG. 3, a primary pulper 1 of the system has positioned downstream therefrom a secondary pulper 2. The primary pulper 1 communicates with the secondary pulper 2 via a pump 24 and a plup feed line 23 connected to the pulp inlet sleeve 6 of the secondary pulper 2. Secondary pulper 2 includes the central drain line 7 from which a fraction of the suspension which is laden with light dirt can be drawn. This fraction of the suspension laden with light dirt is routed to a wash filter 4. Wash filter 4 includes a central agitation space 65 which is separated from an accepted stock space by a screen 68. A paddle wheel 67 is positioned in front of screen 68 and within agitation space 65. Paddle wheel 67 is positioned coaxially with respect to the agitating space. The agitating space 65 is preceded by a coaxially arranged entrance space 69. A stock line 78, which delivers a fraction of the suspension laden with light dirt, is fluidly connected to entrance space 69. Line 78 is connected to entrance space 69 so that it enters space 69 tangentially. A wash water line 19 is also in fluid communication with entrance space 69. Wash water line 19 enters entrance space 69 at the end of the space as illustrated in FIG. 3. It should be appreciated that the housing of secondary pulper 2 has an essentially rotationally symmetric or circular shape. Secondary pulper 2 includes an accepts space 10 which is separated from an agitation space 13 by a screen 11. An agitating wheel is mounted within agitation space 13 and in front of screen 11. Accepted stock separated by screen 11 proceeds through a line 74 to an accepted stock accumulator 75.

The accepts from the accepts space 66 of wash filter 4 are also passed to accepted stock accumulator 75 through a line 76. Further, a stock line 80 extends from agitation space 65 of wash filter 4. The agitating wheel 12 generates in the agitation space 13 of the secondary pulper 2 a turbulent flow which makes it possible to draw from its periphery a fraction laden with heavy dirt and from its central area a fraction laden with light dirt. As previously mentioned, the fraction laden with light dirt is drawn through light stock central drain line 7. An automatically operable valve or slide 21, which is contained in line 78, may be periodically open for passing the respective fraction which is laden with light dirt to the wash filter 4.

Primary pulper 1 includes an accepts space 22 into which an accepts fraction is drawn after being sifted by means of a screen 26 with the aid of a rotor 25. Heavy dirt is discharged from primary pulper 1 as usual through heavy dirt lock 27. A deragging line 28 is connected to primary pulper 1 and runs to a deragger. A line 29 is connected to deragging line 28 for carrying fiber suspension to an extraction apparatus 30. A beater wheel 31 is provided in an extraction space of extraction apparatus 30 and serves to further dissolve the paper shreds. A valve 33 is incorporated in a discharge line 32 which is connected to the extraction apparatus 30. Valve 33 may be kept closed for a period of time so as to affect the dissolution of the paper shreds. Line 32 runs from extraction apparatus 30 to drum sorter 34. Drum sorter 34 rotates about a generally horizontal axis wherein unsortable dirt is removed at the end side through an opening 35. Sorter accepts which are not so heavily laden with dirt proceed through the perforation in the drum sorter 34 and to an accumulator 38. The sortable accepts then proceed to the primary pulper 1 through a line 39.

Heavy dirt laden suspension from secondary pulper 2 recirculated to sleeve 6 via line 52 and valve 53, may instead be drawn by the hydrocyclone 40 through line 41 and may also be routed again to primary pulper 1 through line 42. It is also possible to return the accepts fraction from the hydrocyclone 40 through a line 44 so as to connect with light fraction drain line 7 of the secondary pulper 2 and its agitating space 13.

An automatically operable valve 45 is incorporated in line 80 which exits agitating space 65 of wash filter 4. The accepts line originating from accepts space 66 of wash filter 4 includes a branch 47 having an automatically operable valve 46 contained therein. Accepts drain line 76 also has an automatically operable valve 48 contained there. An automatically operable valve 49 is also provided in water wash line 19.

Once valve 21 has been opened, valves 45 and 46 may be kept closed so as to first route the accepted stock separated in the wash filter from the accepts space 66 to the accumulator 75 (Phase I). Only after a larger amount of dirt has accumulated in the agitating space of the wash filter will valve 48 be closed and valve 46 (in line 47) and valve 49 (in wash water line 19) be opened. It should be mentioned that valve 49 may also be opened somewhat sooner thus continuing for some time to pass usable fiber suspension, which is not so heavily diluted yet, to the accepts accumulator 75 (Phase IIa). The opening of valve 49 and wash water line 19 results in a further agitation and aeration of the fiber suspension contained in the agitating space 65 thereby enabling a further sorting of the fiber suspension by screen 68 (Phase II and/or Phase IIb). The accepts obtained during that time proceed through a line 80 into the drum sorter 36 which rotates about a generally horizontal axis. Drum sorter 36 further includes a perforated cylinder. In a fashion similar to drum sorter 34, the unsortable portion is separated through end opening 37 whereas the sortable accepts, which are relatively lightly laden with dirt, proceed through the perforation and into the accumulator 38. From the accumulator the sortable accepts proceed into the first pulper 1. The two drum components 34 and 36 of the specific embodiment are combined into a unit and are separated by a partition. This suspension is fed through lines 32 and 80 to drum components 34 and 36, respectively, as can be seen by FIG. 3.

As soon as wash water is fed to the wash filter 4 through line 19 (this is, of course, with valve 49 being open), valve 21 in line 78 should suitably be closed. Once line 47 has been open for some time by means of opening valve 46, the valve 46 is closed again and line 45 is opened. With valve 49 open, the wash water washes with the aid of the agitating wheel 67 the residual portion, which specifically consists of dirt portions and contains only few fibers, out of the agitating space 65 through line 80 (Phase III). A fraction still containing usable fiber portions is then reclaimed by drum component 36 and routed into the primary pulper 1 for further processing.

A pump 50 moves the accepted material through line 51 out of the accumulator 75.

In a situation of a lower heavy dirt content, the heavy dirt removal line of the secondary pulper 2 may be connected by a line 52' (illustrated as a dash line) to the wash filter 4, thus preventing additional wear on hydrocyclone 40. As an additional removal Phase Ib, shutoff valve 53' in line 52' may be opened prior to initiation of Phases II and/or IIa and IIb.

It is readily possible to replace drum component 36 by a decker and dump the material of Phase III, and possibly Phase IIb, which hardly contain any usable fiber portion after deckering and use decker water as diluting water for the pulper.

As already mentioned, wash filter 4 comprises an agitating space 65 and an entering space 69 proceeding it. The diameter of the entrance space 69 is considerably smaller than that of the agitating space 65. In fact, the volume of entrance space 69 is only about 30 percent to about 60 percent of the volume of agitating space 65. Agitating space is designed as a compact disk-shaped cylinder. Agitating space has a width b of about 30 centimeters (cm). Its ratio of its width to its diameter D (b/D) ranges between about 0.15 and about 0.35. A ratio (b/D) between about 0.2 and about 0.3 has been found to be most suitable for a favorable wash effect. This results in a large screen area 68 and relative small volume of the agitating space 65. The volume is about only 20 to 50 percent of the volume of agitating space 13 of the secondary pulper 2. The arrangement of the serial entrance space and the flat, disk-shaped agitating space results in a good agitation of the wash water, and due to the large screen area it is possible to obtain a high throughput. Prior wash filters would be entirely insufficient for that purpose due to the treated fiber suspension which is relatively heavily laden with dirt.

The perforation diameter of the screen in the wash filter 4 is suitably selected between 2 and 3 millimeters while the perforation diameter in the secondary pulper ranges between 3 and 5 millimeters. The screen perforation diameter in the drum component 34 is suitably between 18 and 22 millimeters, and in the drum component 36 screen perforation diameter is between 3 and 5 millimeters. The reason for the much finer perforations of the drum component 36 is that the fiber suspension treated herein contains much finer dirt particles. If the drum components were separate, each could have a different speed of rotation and have its diameter adapted to its respective needs.

In addition, defiberizing strips may be provided on screen 68 on the side facing the agitating wheel.

Figure 4:
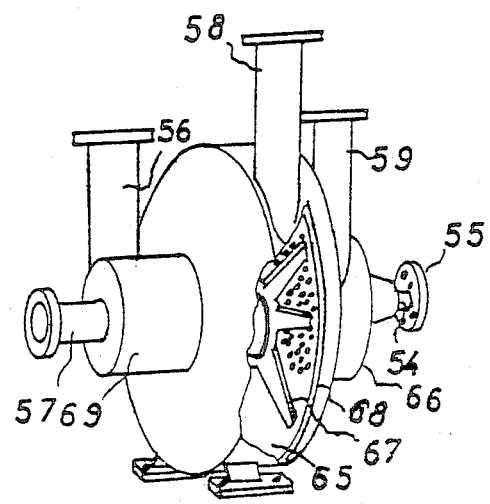
FIG. 4 is a perspective view of a wash filter having a portion of the housing thereof cut away.

Referring to FIG. 4, it can be seen that entrance socket 56 is positioned tangentially relative to entrance space 69, discharge socket 58 is positioned tangentially relative to agitating space 65, and discharge socket 59 is positioned tangentially relative to accepts space 66. The wash water connection 57 is provided in the center of entrance space 69. Further, the rotor is driven by the shaft 57 via a coupling flange 55 as illustrated in FIG. 4.

A major advantage of the invention is that tailing occurs after the wash filter (Phase III and possibly Phase IIb) has only a low fiber content. The duration of phases II and III are very short relative to Phase I (the ratio is about 1:10 to 1:15) so that the material is very extensively defiberized in the agitating space 65 of the wash filter by the rotor and the screen. Therefore, the tailing of the phases as described above can simply be dehydrated and dumped.

Moreover, the invention offers a great advantage in that accepts with a consistency of about 4 percent are obtained downstream of the secondary pulper and the wash filter making deckering unnecessary. Further, the necessary investment is rather low since the drum components having their horizontal axis of rotation and due to their practically continuous operation may be designed to be relatively small. The separating effect is high since using both the diluting water of the hydrocyclone 40 and that of the wash filter 4 for adjusting the consistency of the primary pulper makes for an operation at high dilution. The same applies to the drum components 34 and 36.

Another advantage of the invention is that vibration sorters which are susceptible to malfunction can be entirely avoided.

By using the line 56 indicated by dashed lines in FIG. 3, it would be possible to also avoid the drain device 30, especially in the case of smaller systems with low dirt accrual.

While pulp removed from the secondary pulper 2 through line 78 could as well be passed through a vibration sorter instead of the wash filter 4, its good sorting efficiency would not be obtained, and lastly, higher fiber losses would be incurred in addition to the above disadvantage. It should be mentioned that the structure illustrated in FIGS. 3 and 4 is described in U.S. patent application Ser. No. 680,740, filed on Dec. 12, 1984 except that the secondary pulper 2 in FIG. 3 now has the improved configuration as described in FIGS. 1 and 2.

By connecting the drain line 7 of the secondary pulper 2 intended for a fraction enriched with light dirt to a newly developed wash filter 4 of simple design, the withdrawn suspension is extensively defiberized and cleaned in a waste paper conditioning system. Obtained after the wash filter is accepted stock of relatively high consistency so that a consistency of 4% is attained already in the accepted stock vat. The system of the invention makes it possible to avoid using more expensive equipment while obtaining, for one, accepts and, for another, tailings at a central location. In addition, the system is extensively sealed. The mode of operation of the secondary pulper 2, which is fashioned essentially with a round, cylindrical housing and in which a rotor 12 rotating before a generally flat screen 11 generates a vortex flow whose axis coincides with the cylinder axis 100 of the housing, is improved in that the fiber suspension is fed into the secondary pulper 2 centrally from the end side into the pulp inlet sleeve 6 arranged around the light drain line 7.

While there have been described above the principles of this invention in connection with specific apparatus, it is to be clearly understood that this description is made only by way of example and not as a limitation to the scope of the invention.

I claim:

1. A secondary pulper adapted to receive pulp from a primary pulper in a system for the conditioning and reclaiming of waste paper, said secondary pulper comprising:

an essentially rotationally symmetric housing defining an accepted stock space, a tumbling space with an axis of rotation, and at least one end;

a screen mounted in said housing and separating said tumbling space and said accepted stock space;

an impeller wheel means for generating a vortex flow with a vortex axis positioned and operable in said housing, said vortex axis essentially coinciding with the axis of rotation;

a central drain line having an entrance, said central drain line connected to said one end of said housing and communicating with the tumbling space for removal of fiber suspension enriched with at least light dirt at said one end of said housing, said central drain line entrance having a flared portion surrounding said central drain line entrance, said flared portion containing an opening therein through which fiber suspension enriched with heavy dirt reenters the tumbling space;

a central pulp inlet sleeve on said housing at said one end thereof, said central pulp inlet sleeve having a diameter greater than that of said central drain line, which central drain line extends within and is surrounded in spaced relation by said central pulp inlet sleeve which has one end opening into the tumbling space; and, a circumferential drain line communicating with said tumbling space, and a conduit connecting said circumferential drain line to said central pulp inlet sleeve for the removal of fiber suspension enriched with heavy dirt, such that a portion of said fiber suspension enriched with heavy dirt is introduced into the tumbling space through at least a portion of the space within said central pulp inlet sleeve surrounding said central drain line.

2. A secondary pulper as claimed in claim 1 wherein the central drain line of the secondary pulper is directly connected to a wash filter having a generally circular tumbling space and an accepted stock space separated from the wash filter tumbling space by an essentially flat screen, a tumbling wheel arranged in the wash filter tumbling space in proximity to said flat screen, and an entrance space for fiber suspension and wash water which entrance has a diameter at least one-third smaller than said wash filter tumbling space and further including a wash water connection and a tailing rejects drain line originating from said wash filter tumbling space.

3. A secondary pulper adapted to receive pulp from a primary pulper in a system for the conditioning and reclaiming of waste paper, said secondary pulper comprising:

an essentially rotationally symmetric housing defining an accepted stock space, a tumbling space with an axis of rotation, and at least one end;

a screen mounted in said housing and separating said tumbling space and said accepted stock space;

an impeller wheel means for generating a vortex flow with a vortex axis positioned and operable in said housing, said vortex axis essentially coinciding with the axis of rotation;

a central drain line having an entrance, said central drain line connected to said one end of said housing and communicating with the tumbling space for removal of fiber suspension enriched with at least light dirt at said one end of said housing, said central drain line having a flared portion surrounding said central drain line entrance, which flared portion has an outlet opening;

a central pulp inlet sleeve on said housing at said one end thereof, said central pulp inlet sleeve having a diameter greater than that of said central drain line, which central drain line extends within and is surrounded in spaced relation by said central pulp inlet sleeve which has one end opening into the tumbling space; and, a circumferential drain line communicating with said tumbling space, and a conduit connecting said circumferential drain line to said central pulp inlet sleeve for the removal of fiber suspension enriched with heavy dirt, a separate channel extending from said flared portion outlet opening into said central pulp inlet sleeve, said conduit from said circumferential drain line and said tumbling space connected to said sleeve for communication of said heavy dirt into said tumbling space through said flared portion opening and said separate channel.

4. A secondary pulper as claimed in claim 3 wherein the central drain line of the secondary pulper is directly connected to a wash filter having a generally circular tumbling space and an accepted stock space separated from the wash filter tumbling space by an essentially flat screen, a tumbling wheel arranged in the wash filter tumbling space in proximity to said flat screen, and an entrance space for fiber suspension and wash water which entrance has a diameter at least one-third smaller than said wash filter tumbling space and further including a wash water connection and a tailing rejects drain line originating from said wash filter tumbling space.

* * * * *